United States Patent
Stern et al.

(10) Patent No.: US 6,395,859 B1
(45) Date of Patent: May 28, 2002

(54) HYDROLYZABLE, ENERGETIC THERMOPLASTIC ELASTOMERS AND METHODS OF PREPARATION THEREOF

(75) Inventors: Alfred G. Stern, Upper Marlboro, MD (US); Horst G. Adolph, Warrenton, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/533,085

(22) Filed: Mar. 22, 2000

(51) Int. Cl.[7] .............................. C08J 3/00; C08K 3/20; C08L 75/00
(52) U.S. Cl. .......................... 528/44; 149/4; 149/19.4; 149/19.5; 149/19.6; 149/88; 524/44; 524/589; 524/590; 528/65; 528/85; 528/61
(58) Field of Search ................................. 524/589, 590, 524/44; 528/44, 65, 85, 61; 149/4, 19.4, 19.5, 19.6, 88

(56) References Cited

U.S. PATENT DOCUMENTS 4,806,613 A * 2/1989 Wardle ........................ 528/59
5,436,313 A   7/1995 Klang et al.
5,436,314 A   7/1995 Yang et al.
5,665,822 A   9/1997 Bitler et al.
5,747,603 A   5/1998 Hinshaw et al.
5,783,302 A   7/1998 Bitler et al.

* cited by examiner

Primary Examiner—Patrick D. Niland
(74) Attorney, Agent, or Firm—Mark Homer

(57) ABSTRACT

The present invention provides energetic thermoplastic elastomers which may be used as binders in propellant, explosive and pyrotechnic applications. The elastomers of the present invention are all hydrolyzable, allowing recycling of the elastomer's constituents and/or facilitating other constituents of the propellant, explosive or pyrotechnic. The elastomers of the present invention contain a first polymer, a second polymer having a repeating unit different from that of the first polymer, and a bridging group. Methods of preparing elastomers of the present invention include reaction of the first and second polymers with a dioic acid, or with an organic diisocyanate and a diol containing a formal linkage.

23 Claims, No Drawings

HYDROLYZABLE, ENERGETIC THERMOPLASTIC ELASTOMERS AND METHODS OF PREPARATION THEREOF

BACKGROUND OF THE INVENTION

1. Field of the Invention

The present invention relates to the field of synthetic resins, and more particularly to thermoplastic polymers which are useful as binders in high-energy compositions.

2. Description of the Related Art

High energy formulations, such as those used in propellant, explosive and pyrotechnic (PEP) applications, often comprise solid particulates, such as fuel and oxidizer particulates, dispersed and immobilized throughout a binder matrix which includes an elastomeric polymer. Certain thermoplastic elastomers (TPEs) are desirable binders for PEP applications because they can be processed and reprocessed by melt-casting or extrusion at a temperature which is suitable for processing of energetic materials. This is in contrast to other types of elastomers, such as chemically cross-linked or aplastic elastomers, which must be processed by more complex methods.

Of particular interest are TPEs which are useful as binders for PEP applications and are also "energetic", that is, contribute to the energy content of the PEP material. Such binders allow the PEP material to be more energetic overall than a PEP material made with a non-energetic binder.

Very few TPEs are available which are both energetic and suitable for use as PEP binders. Moreover, those TPEs which are available are made from polymers which are not readily degradable. Degradable polymers would be extremely desirable at the end of the PEP material's life cycle, as disposal of such materials can be a major problem. Moreover, a degradable TPE could allow recovery of the chemicals forming the polymer for recycling and reuse, farther simplifying disposal and saving money.

One example of an energetic TPE binder of the contemporary art can be seen in U.S. Pat. No. 4,483,978, to Manser, entitled ENERGETIC COPOLYMERS AND METHOD OF MAKING THE SAME, which describes polymers made from oxetane or tetrahydrofuran monomers having energetic substituents. However, the described thermoplastic elastomers contain exclusively ether linkages in the backbone, and therefore are not readily degradable.

Another example is seen in the U.S. Pat. No. 4,806,613, to Wardle, entitled METHOD OF PRODUCING. THERMOPLASTIC ELASTOMERS HAVING ALTERNATE CRYSTALLINE STRUCTURE FOR USE AS BINDERS IN HIGH-ENERGY COMPOSITIONS. This patent describes a method of producing a block copolymer of A-blocks and B-blocks, in which the A-blocks and B-blocks are polyethers derived from oxetane and/or tetrahydrofuran. The A-blocks are described as crystalline below about 60° C., and the B-blocks are described as amorphous down to −20° C. Azido or nitrato monomers can be used to provide energetic polymers. However, the described thermoplastic elastomers contain exclusively ether and urethane linkages in the backbone, and therefore are not readily degradable.

U.S. Pat. No. 5,783,302, to Bitler et al., entitled THERMOPLASTIC ELASTOMERS, describes thermoplastic elastomers which have A blocks or B blocks or both A and B blocks, which are crystalline. The crystallinity is attributed to the presence of crystallizable side chains. The patent does not describe degradable polymers or energetic polymers.

A paper by Cannizzo et al., Proceedings of the International Symposium on Energetic Materials Technology, American Defense Preparedness Association, Phoenix, Ariz., September 1995, also describes energetic TPEs, containing azido groups, which are suitable as PEP binders.

Based on our reading of the art, then, we have decided that what is needed is an energetic thermoplastic elastomer which is readily degradable for recovery of the building blocks of the elastomer.

SUMMARY OF THE INVENTION

It is therefore an object of the present invention to provide an improved energetic thermoplastic elastomer.

It is also an object of the invention to provide an improved energetic binder for propellant, explosive and pyrotechnic (PEP) applications.

It is a further object of the invention to provide energetic binders which can be readily broken down at the end of the product life cycle.

It is a yet further object of the invention to provide energetic binders which can be broken down by hydrolysis.

It is a still further object of the invention to provide energetic binders which can be broken down to allow recovery and recycling of the energetic components and other constituents of the binder, as well as other components of the pyrotechnic, explosive or propellant containing the binder.

These and other objects of the invention are accomplished by providing a hydrolyzable thermoplastic elastomer which may be used as a binder in PEP applications. The hydrolyzable thermoplastic elastomers of the present invention may be energetic.

Specifically, a hydrolyzable thermoplastic elastomer of the present invention contains a first polymer block and a second polymer block having a different repeating unit than the first polymer block. The first and second polymer blocks are bridged by a bridging unit which is an organic chain molecule. The connection between the bridging unit and a polymer block may have an ester linkage which allows hydrolyzability. The elastomer may also have an additional bridging unit between some of the polymer blocks linked via a urethane linkage.

In another embodiment, a hydrolyzable thermoplastic elastomer of the present invention contains a first polymer block and a second polymer block having a different repeating unit than the first polymer block. The first and second polymer blocks are bridged by a bridging unit which contains at least one formal (that is, geminal diether) linkage, and the connection between the bridging unit and a polymer block has a urethane linkage.

The first polymer and second polymer blocks may be polyethers such as polyoxetanes. They may be formed of monomers having energetic substituents such as $-N_3$, $-NO_2$, $-ONO_2$, and $-N(NO_2)$-alkyl for providing an energetic elastomeric product. Alternatively, the first or second polymer may also be a polymer such as poly(caprolactone)diol polyformal.

The present invention also encompasses methods of making hydrolyzable elastomers. One method of preparing a hydrolyzable thermoplastic elastomer includes the step of reacting a first polymer comprising a first repeating unit and having hydroxyl termini; a second polymer comprising a second repeating unit different from said first repeating unit and having hydroxyl termini; and a linear dicarboxylic acid; so as to yield a resultant polymer comprising ester linkages formed from the carboxylic acid groups of said dicarboxylic acid and the hydroxyl termini of said first and second polymers. The reaction may be performed by preparing a solution containing the first and second polymers and the dicarboxylic acid as well as dimethylaminopyridine and dicyclohexylcarbodiimide. In addition, dimethylaminopyridine hydrochloride may be added as a cocatalyst. The resultant polymer from the reaction may be further chain-extended by further reacting with an organic diisocyanate.

Here, the first and second polymers may be polyethers, such as poly(oxetanes) or poly(tetrahydrofurans), or one of the polymers may be poly(caprolactone)diol polyformal. The polymers may be formed of monomers having energetic substituents such as $-N_3$, $-NO_2$, $-ONO_2$, and $-N(NO_2)$-alkyl for providing an energetic elastomeric product. For example, the first polymer may be poly (AMMO) or poly(BAMO), where BAMO is 3,3-bis (azidomethyl)oxetane and AMMO is 3-azidomethyl-3-methyloxetane.

A second method of preparing a hydrolyzable thermoplastic elastomer, includes the steps of: end-capping the hydroxyl termini of a first polymer comprising a first repeating unit by reacting the first polymer with an organic diisocyanate; end-capping the hydroxyl termini of a second polymer comprising a second repeating unit different from said first repeating unit, by reacting the second polymer with an organic diisocyanate; and reacting the end-capped first polymer and the end-capped second polymer with a linear diol comprising a formal linkage, to form urethane links between said end-capped first and second polymers and said linear diol. As in the first method, the first polymer and second polymer blocks may be polyethers such as polyoxetanes. They may be formed of monomers having energetic substituents such as $-N_3$, $-NO_2$, $-ONO_2$, and $-N(NO_2)$-alkyl for providing an energetic elastomeric product.

DETAILED DESCRIPTION OF THE INVENTION

The present invention provides new energetic thermoplastic elastomers which are copolymers containing at least two different polyether blocks linked by hydrolyzable linkages. The use of two different polyether blocks in the copolymer allows the design of TPEs having desirable melting characteristics.

A variety of polyether blocks may be used in the present invention. Of particular interest are polyethers based on substituted oxetane or tetrahydrofuran. The general structure of polyoxetanes is given in equation (1) and the general structure of substituted poly(tetrahydrofuran) is given in equation (2).

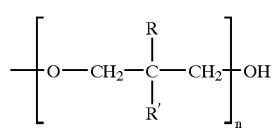
(1)

-continued

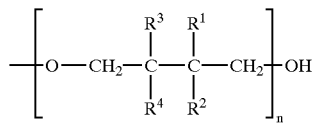
(2)

Here, the substituents R can be selected from a variety of moieties, including: alkyl, azidoalkyl, $-NO_2$, nitroalkyl, $-N(NO_2)$-alkyl, alkenyl, alkynyl, $-O$-alkyl, $-NH$(alkyl), and $-N$(alkyl)$_2$.

Of interest as energetic polyethers are the polymers of 3,3-bis(azidomethyl)oxetane (BAMO), shown in equation (3), and 3-azidomethyl-3-methyloxetane (AMMO), shown in equation (4).

BAMO
(3)

AMMO
(4)

For these respective polyoxetanes, groups R and R' in equation (1) would both be $-CH_2-N_3$ or would be $-CH_2-N_3$ and $-CH_3$.

Other energetic polyoxetanes which are suitable for the present invention include polymers of 3-azidomethyl-3-nitratomethyloxetane (AMNO); 3,3-bis (methylnitraminomethyl)oxetane (AMNAMO); 3,3-bis (methylnitratomethyl)oxetane (BMNAMO); 3,3-bis (nitratomethyl)oxetane (BNMO); 3-methylnitraminomethyl-3-methyloxetane (MNAMMO); and 3-nitratomethyl-3-methyloxetane (NMMO). Non-energetic oxetanes include 3,3-bis(acetoxymethyl)oxetane (BAOMO); 3,3-bis(chloromethyl)oxetane (BCMO); 3,3-bis (ethyoxymethyl)oxetane (BEMO); 3,3-bis(fluoromethyl) oxetane (BFMO); 3,3-bis(hydroxymethyl)oxetane (BHMO); 3,3-bis(iodomethyl)oxetane (BIMO); 3,3-bis (methoxyethoxymethyl)oxetane (BMEMO); 3,3-bis (methoxymethyl)oxetane (BMMO); 3-chloromethyl-3-methyloxetane (CMMO); 3-hydroxymethyl-3-methyloxetane (HMMO); 3-iodomethyl-3-methyloxetane (IMMO); and 3-octoxymethyl-3-methyloxetane (OMMO).

In polymers of the present invention, two blocks formed of different polyethers (or one block formed of a polyether and the other block of poly(caprolactone)diol polyformal) are linked by a connecting group having a hydrolyzable linkage. The hydrolyzable linkage of the present invention may be an ester linkage or may be a formal, or gem-diol, that is, a unit of general structure $R-O-CH_2-O-R$. Therefore, one general composition of the present invention contains at least two polyether units of different repeating unit structure, and contains a formal linkage located between the two polyether units. Another general composition of the present invention contains two polyether units of different repeating unit structure, and contains an ester linkage between the two polyether units.

The following specific Examples detail synthetic methods and chemical structures of compositions of the present invention. In the following examples, the molecular weights of the polymers were determined by gel permeation chromatography, using a Toyo Soda Micropak TSK 4000H column plus two TSK 3000H size exclusion columns, each 30 cm×0.75 cm. A Waters Model 6000A delivery system, model U6K injector, Model 440 UV detector and Model R-401 IR detector were used. The molecular weight determinations were calibrated with polyethyleneglycol standards. Selected polymers were further characterized using differential scanning calorimetry and qualitative elastomeric tests.

EXAMPLE A

Poly(AMMO)/Poly(BAMO) Block Copolymer

Poly(AMMO) and poly(BAMO) were synthesized using conventional methods. Poly(AMMO) (MW 4900, 1.960 g (0.4 mmol)), poly(BAMO) (MW 3300, 0.660 g (0.2 mmol)), 3,6,9-trioxaundecanedioic acid ((369T), 0.155 g (0.6 mmol)), and 10 mL of dichloromethane were placed in a three-necked flask and the dichloromethane was distilled off at 45–50° C. under a slow stream of dry nitrogen. After cooling to room temperature, 0.015 g of 4-dimethylaminopyridine (DMAP, 0.12 mmol) was added followed by 8 mL of dichloromethane. The mixture was stirred until homogeneous, and the flask was cooled in an ice-water bath. A 1 M solution of dicyclohexylcarbodiimide (DCC) in dichloromethane (1.2 mmol) was added with stirring, cooling was discontinued, and the mixture was stirred at room temperature under a blanket of nitrogen for 5 days. Dicyclohexylurea was observed to precipitate upon addition of DCC, suggesting that reaction may have been fairly rapid.

The mixture was stirred for 1 h while exposed to the room atmosphere to react excess DCC, was then cooled in a refrigerator for several hours, and was filtered through a Buchner funnel. The collected precipitate was washed with a small amount of cold dichloromethane, and the filtrate (about 10 mL) was added dropwise with rapid stirring to about 40 mL of methanol. The liquid was decanted and the polymer was dried in vacuo, yielding 2.35 g of a polymer designated A-1. Polymer A-1 was determined to have a molecular weight of 35,000.

The above polymer (2.08 g) was dissolved in 10 mL of dichlioromethane and the solvent was distilled off as described above. Dichloromethane (8 mL) was added, and after the polymer had dissolved, 2,4-toluenediisocyanate (TDI, 0.00745 mL) and dibutyltin dilaurate (DBTDL, 0.001 mL) were added. The mixture was heated to 60° C. for about 40 h and was allowed to cool. The polymer was isolated by addition of the solution to methanol as described above, yielding 1.89 g of polymer A-2. This polymer was determined to have a molecular weight of 85,000.

A variation of the synthesis of A-1 was performed by adding dimethylaminopyridine hydrochloride as cocatalyst during the esterification step. This increases the molecular weight of the resulting polymers. An example of this is as follows:

Poly(AMMO) (MW 4900, 1.960 g (0.4 mmol)), poly(BAMO) (MW 3300, 0.660 g (0.2 mmol)), 3,6,9-trioxaundecanedioic acid ((369T), 0.155 g (0.6 mmol)), and 10 mL of dichloromethane were placed in a three-necked flask and the dichloromethane was distilled off at 45–50° C. under a slow stream of dry nitrogen. After cooling to room temperature, 0.015 g of 4-dimethylaminopyridine, (DMAP, 0.12 mmol), and 0.015 g 4-dimethylaminopyridine hydrochloride (0.095 mmol) were added followed by 8 mL of dichloromethane. The mixture was stirred until homogeneous, and the flask was cooled in an ice-water bath. A 1 M solution of dicyclohexylcarbodiimide (DCC) in dichloromethane, 1.35 mL, (1.2 mmol+10% excess) was added with stirring, cooling was discontinued, and the mixture was stirred at room temperature under a blanket of nitrogen for 5 days. Dicyclohexylurea was observed to precipitate upon addition of DCC, suggesting that reaction may have been fairly rapid.

The mixture was treated as described above for polymer A-1, yielding 2.35 g of a polymer designated A-3. This polymer was determined to have a molecular weight of 60,000.

EXAMPLE B

Poly(BAMO)/Poly(caprolactone)diol Polyformal Polyester Block Copolymer

Poly(caprolactone)diol polyformal was prepared by adding poly(caprolactone)diol (MW 530, Aldrich Chemical Company, 7.36 g), paraformaldehyde (0.42 g) and 5.5 mL of dichloromethane to a three-necked flask under nitrogen. The flask was cooled in an ice-water bath and 1.39 mL of $BF_3$ etherate was added dropwise with stirring. Cooling was discontinued and the mixture was stirred for 22 h. After dilution with 20 mL of dichloromethane the solution was poured into 25 mL of water containing 2.8 g of sodium bicarbonate, and this mixture was stirred for 0.5 h. The dichloromethane phase was separated, dried over $MgSO_4$, and freed of solvent to give 7.4 g of the product as a light brown oil. The MW was determined by gel permeation chromatography to be 3400.

Poly(BAMO) (MW 3300, 0.60 g (0.2 mmol)), 2.04 g of poly(caprolactone)diol polyformal (0.6 mmol), 0.206 g of 369T (0.8 mmol), 8 mL of dichloromethane, 1.76 mL of 1 M DCC solution in dichloromethane, and 0.0195 g of DMAP were reacted using the same procedure as in Example A-1, yielding a polymer designated B-1. Polymer B-1 was determined to have molecular weight 23500.

A solution of 2.126 g of this polymer in 6 mL of dichloromethane was reacted as in Example A with 0.0158 g of TDI and 0.001 mL of DBTDL to perform a chain-extension, yielding polymer designated B-2 having a molecular weight of 35,000.

EXAMPLE C

Poly(BAMO)/Poly(AMMO) Polyurethane Block Copolymer 3,5-Dioxaheptanediol (DHD) was prepared by a literature procedure and was fractionated twice over potassium carbonate, bp 86–89° C. at approx. 0.01 Torr.

Poly(AMMO)(MW 4900) 1.960 g (0.4mmol) and 0.396 g of poly(BAMO)(MW 3300, 0.12 mmol) were dried with 10 mL of dichloromethane and then dissolved in 8 mL of dry dichloromethane. TDI, 0.174 g (1 mmol, 0.143 mL) and 0.003 mL of DBTDL were added and the mixture was stirred for 5 days at 35° C. Some additional dichloromethane was added to replace solvent lost due to evaporation, followed by 0.068 g of DHD (0.5 mmol, 0.060 mL). The solution was again stirred at 35° C. for 5 days and the polymer was isolated by precipitation from methanol as above, yielding 2.35 g of polymer C. Polymer C was determined to have a molecular weight of 50,000.

COMPARATIVE EXAMPLE D

Poly(AMMO)Poly(BAMO) Non-hydrolyzable Polymers

Polymers prepared using the methods of Wardle and Cannizzo, as noted above, using poly(BAMO), poly(AMMO), TDI and butanediol, were provided by Wardle. A polymer containing 12% BAMO is designated D-1. A polymer containing 15% BAMO is designated D-2. A polymer containing 18% BAMO is designated D-3.

The general chemical structures of the polymer of the present invention can be inferred from the known chemistry of the reactions.

Polymers A-1 and A-3 are composed of poly(AMMO) and poly(BAMO) blocks, both of which are polyoxetanes. The hydroxyl ends of these blocks are linked via ester linkages through the difunctional diacid, 3,6,9-trioxaundecanedioic acid. The general structure of polymer A-1 or A-3 can therefore be expressed as containing units of formula:

(5)

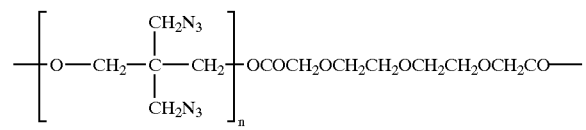

and units of formula:

(6)

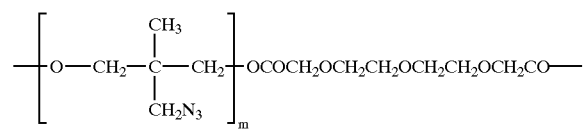

Polymers A-1 and A-3 are believed to be random copolymers of these two units in a ratio determined by the ratio of poly(AMMO) and poly(BAMO) in the reaction mixture.

Polymer A-2 is prepared by chain-extension of polymer A-1 using 2,4-toluenediisocyanate. This forms urethane links between unreacted hydroxyl termini of the poly(AMMO) or poly(BAMO), of general formula:

(7)

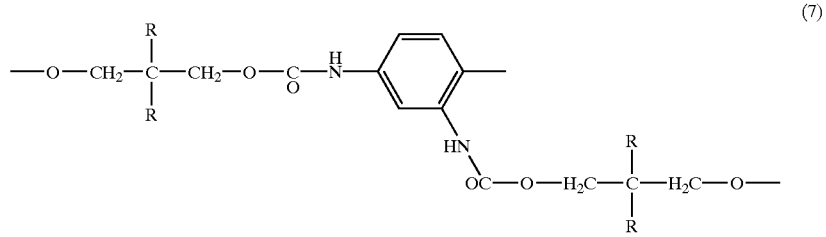

The 2- and 4-urethane linkages may be made to either a BAMO or an AMMO moiety, although there may be preference for one over the other.

Polymer B-1 is composed of poly(BAMO) and poly(caprolactone)diol polyformal blocks linked via ester linkages through the difunctional diacid, 3,6,9-trioxaundecanedioic acid. Thus, polymer B-1 has units of the general structure as shown in equation (5) above, containing poly(BAMO). Polymer B-1 likewise has units containing poly(caprolactone)diol polyformal blocks.

Polymer C is composed of poly(AMMO) and poly(BAMO) blocks linked via urethane linkages from the difunctional 2,4-toluenediisocyanate to 3,5-dioxaheptanediol. The fact that the two isocyanate groups have different reactivities is used to advantage in the method of preparation of preparation of these polymers, as noted in U.S. Pat. No. 4,806,613, to Wardle, since this allows the addition of a stoichiometric amount of TDI to the poly(AMMO) and poly(BAMO) blocks in a step which results primarily in the end-capping of these blocks without cross-linking. The free isocyanate groups are then available for reaction with DHD in a subsequent step. Without this difference in reactivity, it would be necessary to react a diisocyanate molecule in large excess, and then remove the excess before adding DHD. Since the two positions of 2,4-toluenediisocyanate have different reactivities, it is believed that primarily the 4-position is linked to the poly(AMMO) or poly(BAMO) and primarily the 2-position is linked to the dioxaheptanediol. However, the prepared composition will have some fraction of the toluenediisocyanate molecules linking in the reverse manner. Therefore, polymer C can be considered to contain units of general formula:

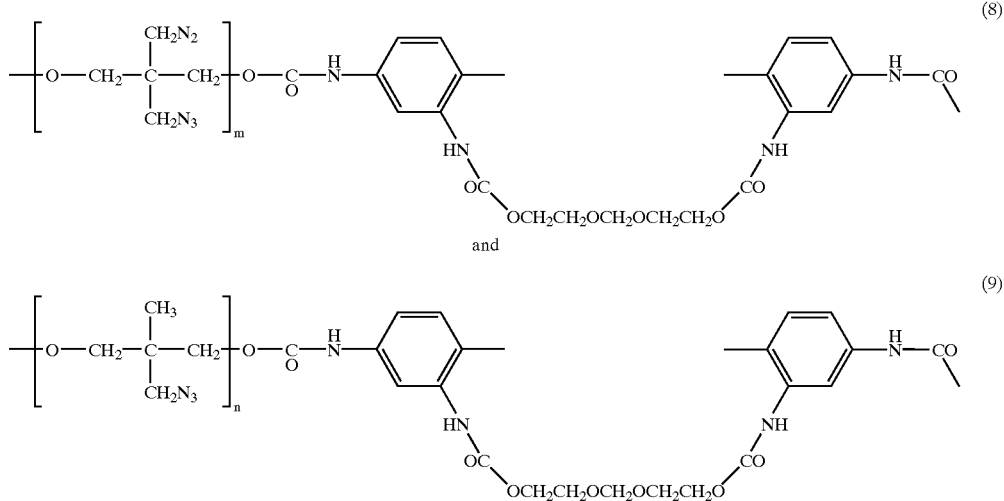

where m and n are integers greater than 1.

Polymers A-2, B-2 and C were characterized by gel permeation chromatography and differential scanning calorimetry. The differential scanning calorimetric results of all samples showed low and broad melt transitions, as summarized in the $T_G$ and $T_M$ values of Table I. These values are calculated from the midpoint of the differential scanning calorimetry slopes.

TABLE I

Properties of Hydrolyzable Elastomers of the Present Invention and Comparative Examples

| Polymer | BAMO content | Molecular Weight (Mp) | DSC $T_{G'}$ | DSC $T_M$ | Hydrolysis Test (Mp) 1 day | 7 days |
|---|---|---|---|---|---|---|
| A-1 | 24% | 35000 | | | | |
| A-2 | 24% | 85000 | −36 | 50 | 25000 | 10000 |
| A-3 | 24% | 60000 | | | | |
| B-2 | 22 | 35000 | −49 | 58 | 7000 | 3000 |
| C | 15 | 50000 | −31 | 61 | 40000 | 33000 (2N) |
| D-1 | 12 | 40000 | | | 40000 | 40000 |
| D-2 | 15 | 40000 | −27 | 60 | 40000 | 40000 |
| D-3 | 18 | 55000 | | | 55000 | 55000 |

The polymers were further subjected to a hydrolysis test. In the hydrolysis test, the polymers were dissolved in dichloromethane and stirred with 1 N aqueous HCl (or, in one case, 2 N as indicated in the Table) in the presence of a small amount of surfactant at room temperature. Samples were withdrawn for analysis by gel permeation chromatography for determination of average molecular weight.

As can be seen from Table I, polymers A-2, B-2 and C of the present invention all show a reduction in MW in the hydrolysis test over the course of several days, indicating hydrolysis of the polymer to varying extents. Polymer C, which contains urethane linkages and is based on DHD as the hydrolyzable link, showed the least amount of hydrolysis, with the MW falling from 50000 to 33000 in 7 days of exposure to 2 N HCl. Polymer A-2, which has ester linkages to 369T, showed substantial hydrolysis from a starting MW of 85000 to 10000 in 7 days. Polymer B-2, which is based on poly(caprolactone)diol polyformal and also has ester linkages to 369T, showed extensive hydrolysis after 7 days, from a starting MW of 35000 to 3000, which is approximately the MW of the poly(BAMO) used in the synthesis of B-2 (MW 3300). The poly(caprolactone)diol polyformal block itself is also expected to be hydrolyzable in B-2. By comparison, polymers of comparative examples D-1, D-2 and D-3 showed no change in molecular weight, consistent with these polymers containing no hydrolyzable linkages.

The polymer samples were also subjected to qualitative elastomeric analysis. Polymer A-1 was readily meltable at 65° C. Polymer A-2, which is prepared from A-1 by reaction with a small amount of TDI, was found to have improved elastomeric properties. Polymers A-2 and B-2 were found to soften and exhibit loss of elastomeric properties near 65° C. Polymer C has good elastomeric properties at room temperature, and softens and begins to lose elastomeric properties near 95° C. Polymers D-1 and D-2 soften and begin to lose elastomeric properties near 65° C.

Polymers A-2, A-3 and C are considered to have reasonable elastomeric properties, similar to those obtained for comparative samples D-1 and D-2, which contain 12 and 15% poly(BAMO). Polymer B-2 is considered to be fairly weak. Comparative sample D-3 did not appear to soften or lose elastomeric properties at 95° C.

It is believed that modifying polymer A-2 should lead to a polymer highly suitable for use as an energetic binder. In particular, the synthetic conditions of Example A may be modified to use higher molecular weight poly(BAMO) or poly(AMMO) and the block ratio of poly(BAMO) to poly(AMMO) may be adjusted to alter properties of the polymer, including the TM. In addition to the hydrolyzable property of such polymers, it is believed that these polymers will yield a TPE which has lower melt viscosity and is more easily processible than the corresponding urethane polymers disclosed by Wardle.

Therefore, the compositions of the invention can be expressed as follows. In one embodiment, a hydrolyzable thermoplastic elastomer of the present invention contains a first polymer block and a second polymer block having a different repeating unit than the first polymer block. The first and second polymer blocks are bridged by a bridging unit which is an organic chain molecule. A connection between the bridging unit and the polymer block has an ester linkage, as in the case of Examples A and B. The elastomer may also have an additional bridging unit between some of the polymer blocks linked via a urethane linkage, as in Examples A-2 and B-2.

In another embodiment, a hydrolyzable thermoplastic elastomer of the present invention contains a first polymer block and a second polymer block having a different repeating unit than the first polymer block. The first and second polymer blocks are bridged by a bridging unit which is an organic chain molecule containing at least one formal linkage. The connection between the bridging unit and a polymer block has a urethane linkage, as in the case of Example C.

The first polymer and second polymer blocks may be polyethers such as polyoxetanes. They may be formed of monomers having energetic substituents such as —$N_3$, —$NO_2$, —$ONO_2$, and —$N(NO_2)$-alkyl for providing an energetic elastomeric product.

In one embodiment of the invention using the ester linkage between the bridging unit and the polymer blocks, one of the polymer blocks may be poly(caprolactone)diol polyformal.

The general methods of preparation of elastomers of the present invention can be expressed as follows. One method of preparing a hydrolyzable thermoplastic elastomer includes the step of reacting a first polymer comprising a first repeating unit and having hydroxyl termini; a second polymer comprising a second repeating unit different from said first repeating unit and having hydroxyl termini; and a linear dicarboxylic acid; so as to yield a resultant polymer comprising ester linkages formed from the carboxylic acid groups of said dicarboxylic acid and the hydroxyl termini of said first and second polymers. The reaction may be performed by preparing a solution containing the first and second polymers and the dicarboxylic acid as well as dimethylaminopyridine and dicyclohexylcarbodiimide. In addition, the solution may contain dimethylaminopyridine hydrochloride. The resultant polymer from the reaction may be further chain-extended by reacting it with an organic diisocyanate.

Here, the first and second polymers may be polyethers, such as poly(oxetanes) or poly(tetrahydrofurans), or one of the polymers may be poly(caprolactone)diol polyformal. The polymers may be formed of monomers having energetic substituents such as —$N_3$, —$NO_2$, —$ONO_2$, and —$N(NO_2)$-alkyl for providing an energetic elastomeric product. For example, the first polymer may be poly(AMMO) or poly(BAMO).

A second method of preparing a hydrolyzable thermoplastic elastomer, includes the steps of: end-capping the hydroxyl termini of a first polymer comprising a first repeating unit by reacting the first polymer with an organic diisocyanate; end-capping the hydroxyl termini of a second polymer comprising a second repeating unit different from said first repeating unit, by reacting the second polymer with an organic diisocyanate; and reacting the end-capped first polymer and the end-capped second polymer with a linear diol comprising a formal linkage, to form urethane links between said end-capped first and second polymers and said linear diol. As in the first method, the first polymer and second polymer blocks may be polyethers such as polyoxetanes. They may be formed of monomers having energetic substituents such as —$N_3$, —$NO_2$, —$ONO_2$, and —$N(NO_2)$-alkyl for providing an energetic elastomeric product.

In both the first and second methods, the ratio of the first and second polymers in the reaction may be adjusted to determine the ratio of first and second polymer blocks in the hydrolyzable elastomer. This ratio may be adjusted to affect one or more of the relevant elastomeric properties of the elastomer, such as $T_G$ or $T_n$. For example, in the case of use of poly(BAMO) and poly(AMMO), the content of poly(BAMO) may be in the range of approximately 15 to 25% of the total of poly(AMMO) and poly(BAMO). The average molecular weight of the starting polymers may, for example, be in the range of approximately 3000 to 5000. The average molecular weight of the product elastomers of the present invention may, for example, be in the range of approximately 35000 to 85000 as determined by gel permeation chromatography. Polymers of the present invention may have values of $T_G$, as determined by differential scanning calorimetry in the range of approximately −31 to −49° C., and may have values of $T_M$ in the range of approximately 50 to about 80° C.

The elastomers of the present invention may be used in a number of applications, in particular as binders in PEP applications. After the end of the useful life of the propellant, explosive or pyrotechnic, the binder may be recovered and may be recycled by hydrolyzing in acid to release small polymer units containing the starting polymers. In addition, this hydrolysis may facilitate recovery of other constituents of the propellant, explosive or pyrotechnic. The elastomers of the present invention therefore have a property and utility not seen in other elastomers having otherwise similar elastomeric properties.

While the invention has been described in terms of the embodiments described above, it will be evident that modifications to these embodiments may be made by one of ordinary skill in the art without departing from the scope of the present invention.

What is claimed is:

1. A hydrolyzable thermoplastic elastomer, comprising:
   a first polymer block, being isocyanate-terminated, comprising a first repeating unit;
   a second polymer block, being isocyanate-terminated, comprising a second repeating unit different from said first repeating unit,
   a bridging unit, having a residue being hydroxy-terminated, linking said first polymer block to said second polymer block, said bridging unit comprising an internal formal group, being hydrolyzable.

2. The hydrolyzable thermoplastic elastomer of claim 1, said bridging unit comprising a chemical structure selected from the following group:
   —$OCH_2CH_2$—O—$CH_2$—O—$CH_2CH_2$—O—; or,
   —$CH_2OCH_2CH_2OCH_2CH_2OCH_2$—.

3. The hydrolyzable thermoplastic elastomer of claim 1, said first repeating unit being represented by the formula:

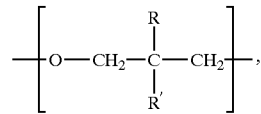

where R and R' are independently selected from the substituents: alkyl, azidoalkyl, —$NO_2$, nitroalkyl, —$N(NO_2)$-alkyl, alkenyl, alkynyl, —O-alkyl, —NH (alkyl), and —$N(alkyl)_2$.

4. The hydrolyzable elastomer of claim 3, said second repeating unit being represented by the formula:

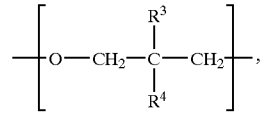

where $R^3$ and $R^4$ are independently selected from the substituents: alkyl, azidoalkyl, —$NO_2$, nitroalkyl, —$N(NO_2)$-alkyl, alkenyl, alkynyl, —O-alkyl, —NH (alkyl), and —$N(alkyl)_2$.

5. The hydrolyzable thermoplastic elastomer of claim 1, said first repeating unit comprising a substituent selected from —N$_3$, —NO$_2$, —ONO$_2$, and —N(NO$_2$)-alkyl, for providing an energetic elastomer.

6. A hydrolyzable thermoplastic elastomer, comprising:
a first unit having the chemical formula:

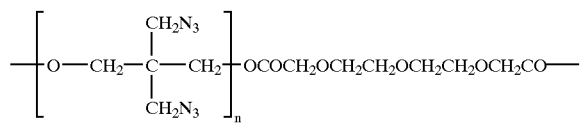

and a unit having the chemical formula:

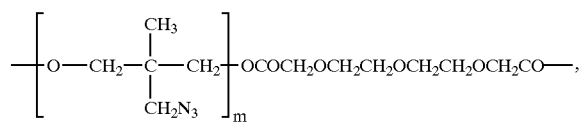

where m and n are integers greater than 1.

7. A hydrolyzable thermoplastic elastomer, comprising:
a first unit having the chemical formula:

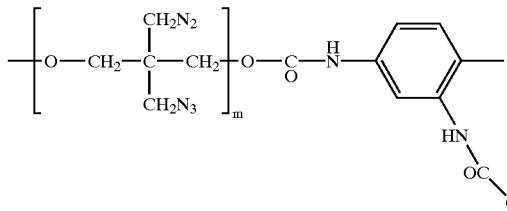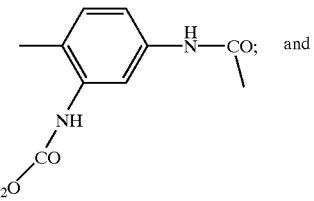 and a second unit having the chemical formula:

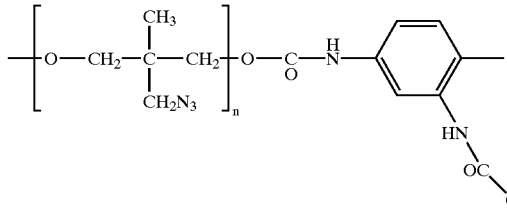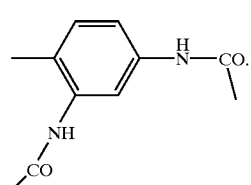

8. A method of preparing a hydrolyzable thermoplastic elastomer, comprising the steps of:
reacting a first polymer comprising a first repeating unit and having hydroxyl termini, a second polymer comprising a second repeating unit different from said first repeating unit and having hydroxyl termini, and a linear dicarboxylic acid; and,
preparing a reaction mixture comprising said first polymer, said second polymer, said linear dicarboxylic acid, dimethylamineopyridine, and dicyclohexylcarbodiimide wherein the resultant elastomer comprises ester linkages between the carboxylic acid groups of said dicarboxylic acid and the hydroxyl termini of said first and second polymers.

9. The method of claim 8, said reacting step further comprising:

including dimethylaminopyridine hydrochloride in said reaction mixture.

10. The method of claim 8, said linear dicarboxylic acid being 3,6,9-trioxaundecanedioic acid.

11. The method of claim 8, said linear dicarboxylic acid being one of the group of alkanedioic acids.

12. The method of claim 8, said linear dicarboxylic acid being fumaric acid.

13. The method of claim 8, said first repeating unit comprising a substituent selected from —N$_3$, —NO$_2$, —ONO$_2$, and —N(NO$_2$)-alkyl, for providing an energetic elastomer.

14. The method of claim 8, said first polymer being a polyether.

15. The method of claim 8, said second polymer being a polyether.

16. The method of claim 13, said first polymer being poly(3,3-bis(azidomethyl)oxetane).

17. The method of claim 13, said first polymer being poly(3-azidomethyl-3-methyloxetane).

18. The method of claim 16, said second polymer being poly(3-azidomethyl-3-methyloxetane).

19. The method of claim 16, said second polymer being poly(caprolactone)diol polyformal.

20. The method of claim 8, said second polymer being poly(caprolactone)diol polyformal.

21. The method of claim 8, further comprising the step of:
collecting and drying the resultant polymer from said reacting step.

22. The method of claim 21, said collecting step comprising the steps of:
filtering the reaction mixture from said reacting step; and
adding the filtrate to methanol to precipitate the resultant polymer.

23. The method of claim 21, further comprising the step of:
further reacting the resultant polymer with 2,4-toluenediisocyanate and dibutyltin dilaurate, for chain-extending the resultant polymer.

* * * * *